Figure 1:
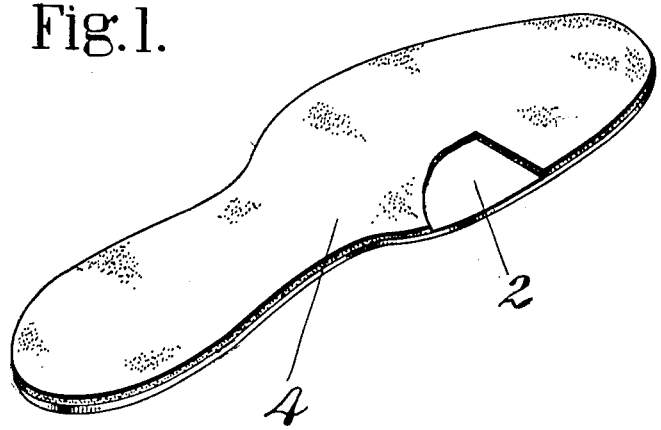

H. A. DAVENPORT.
INSOLE.
APPLICATION FILED AUG. 23, 1918.

1,387,691.

Patented Aug. 16, 1921.

INVENTOR.
Herman A. Davenport

UNITED STATES PATENT OFFICE.

HERMAN A. DAVENPORT, OF BROCKTON, MASSACHUSETTS, ASSIGNOR TO UNITED SHOE MACHINERY CORPORATION, OF PATERSON, NEW JERSEY, A CORPORATION OF NEW JERSEY.

INSOLE.

1,387,691.      Specification of Letters Patent.      Patented Aug. 16, 1921.

Application filed August 23, 1918. Serial No. 251,112.

*To all whom it may concern:*

Be it known that I, HERMAN A. DAVENPORT, a citizen of the United States, and resident of Brockton, in the county of Plymouth and State of Massachusetts, have invented certain Improvements in Insoles, of which the following description, in connection with the accompanying drawings, is a specification, like reference characters on the drawings indicating like parts in the several figures.

The present invention relates to the manufacture of vulcanized rubber foot wear and more particularly to improvements in insoles for use in the production of foot wear of this type.

In the manufacture of vulcanized rubber soled shoes it is important to employ an insole made of a material which may be vulcanized in order that the insole may become amalgamated with the other vulcanizable materials which are used to form a bottom for the shoe. Another reason for using an insole of such material is that it enables the shoe upper more readily to be secured in lasted position on the insole by cement and become strongly attached to the insole upon vulcanization of the shoe. The insoles which are now commonly used are made of an inexpensive grade of rubber compound termed "rag stock" which is usually so limp when handled and weak in texture in its uncured or unvulcanized condition that it can not be shaped and reliably retained in conformation with the curvatures of the last bottom when applied to the last. Consequently when the shoe is lasted considerable trouble is occasioned by the insole being displaced on the last and if the shoe is vulcanized in this condition the vulcanization of the constituent parts of the shoe is defective and the appearance of the shoe seriously impaired. Moreover, in the use of a rag stock insole with the machine process of lasting wherein the shoe upper is placed under considerable tension and held in lasted position by tacks driven into the insole even greater difficulty is experienced because the rag stock material of which the insole is composed does not present sufficient body and is not strong enough to hold the lasting tacks securely and also there is considerably more tendency with this process to displace the insole.

An object of the present invention is to produce an insole for use in the manufacture of vulcanized rubber soled foot wear by the use of which either the hand lasted or the machine lasted vulcanized rubber soled shoe may be made more advantageously and expeditiously than with the rag stock insole heretofore used and which will enable a better appearing and more serviceable shoe to be produced and this without forfeiting the advantages of rag stock insoles or increasing shoe cost.

With this object in view and in accordance with an important feature of the invention the insole comprises a sole-shaped body of vulcanizable material and a body of fibrous material which is adapted to be molded and retain the mold imparted to it, said moldable and molded body being united to the upper surface of the said vulcanizable material. As herein illustrated, one layer of material conveniently consists of a thin layer of uncured rubber or so-called rag stock which is of substantially less thickness than is ordinarily employed with an all rag stock insole; and the fibrous material which, in fact, constitutes a backing consists of a layer of fiber board or similar material of sufficient thickness to be molded to the desired shape and retain that molded shape, the two being secured together by cement which, during the vulcanization of the shoe, preferably effects an additional vulcanized union of the two layers. This fiber board layer is also preferably of sufficient texture and thickness and strength to enable lasting tacks such as are employed with the machine method of making these shoes to be driven and clenched. By providing a laminated insole structure of this character the vulcanizable layer of material offers the same advantages in connection with other vulcanizable portions during lasting and vulcanizing the shoe that are offered by the all rag stock insole while the fiber board layer serves to insulate the foot from the vulcanized rubber materials of the insole and the constituent parts of the shoe bottom thus making the shoe more comfortable to wear. In addition the fiber board layer appreciably stiffens the entire bottom of the shoe and not only maintains the desired shape of the shoe and presents a permanently smooth surface for the sole of the foot but increases its serviceability.

In accordance with a further feature of the invention the two layers of material constituting the insole structure are molded together to the approximate longitudinal and lateral curvatures of the bottom of the shoe last to which it is to be applied. Thus the insole when applied to the last presents a firm and uniformly supported surface upon which to last the margin of the shoe upper without tendency of the insole to become displaced and later become vulcanized in displaced condition. Moreover the fiber board layer imparts a degree of rigidity to the insole which enables it to hold the shoe to the shape of the last upon which the shoe is made after the last is removed from the shoe. A serious objection to vulcanized rubber soled shoes as heretofore made, is the lack of shape and style of such shoes. An insole of this structure is, therefore of considerable importance in the manufacture of this type of shoe inasmuch as it enables a vulcanized rubber soled shoe to be made so as to have the same general characteristics as shoes of other types.

Other objects and features of the invention will be more fully described in connection with the accompanying drawings and the invention will then be pointed out in the appended claims.

In the drawings,—

Figure 2:
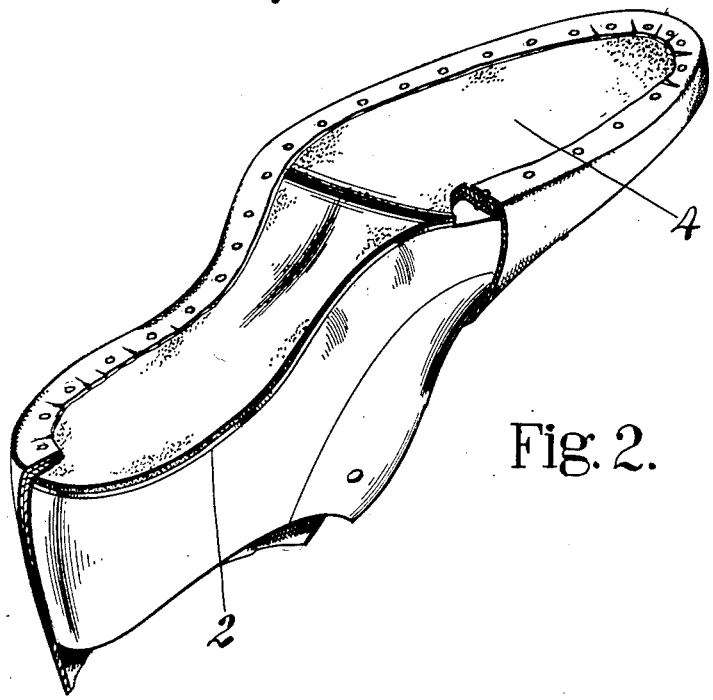

Figure 1 is a perspective view, partly in section, of an insole made in accordance with a preferred embodiment of the invention, and Fig. 2 is a perspective view illustrating the incorporation of the insole in the shoe of the vulcanized sole type.

In the illustrated preferred embodiment of the invention the insole consists of an upper layer of fiber board 2 and a lower layer of an unvulcanized rubber compound 4 attached by cement to the fiber layer. Conveniently in producing the insole large sheets of the uncured rubber compound and the fiber board are placed upon one another and the required number of insole blanks died out. The uncured rubber stock is conveniently the rag stock material now used for insoles in shoes of the vulcanized rubber sole type although it will be found necessary to use a layer of material only about one-half the thickness ordinarily used. The fibrous layer may consist of any material which can be molded to predetermined shape and the mold retained and at the same time offer a suitable body to receive lasting tacks. For this purpose a thin sheet of sulfite board has been found very satisfactory inasmuch as it can be readily molded to various contours and subjected to a vulcanizing heat without cracking and in addition it has sufficient texture to retain its mold and that of the rag stock and, also, it is adapted to receive and hold lasting tacks. The two layers are preferably and as herein illustrated united by a rubber cement which subsequently forms a vulcanized union between the two layers although other forms of attachment could be used satisfactorily, for example, a row of marginal stitching.

As herein illustrated and in accordance with an important feature of the invention, the insole structure is molded to the longitudinal and lateral curvatures of the last to which it is to be applied prior to its being used. This is preferably accomplished by subjecting the insole to the action of suitably shaped molds arranged to impart the desired shape to the insole without changing the relative structure of the two layers of material comprising the insole. By backing or reinforcing the relatively limp layer of rag stock with the moldable layer of fiber board not only a more exact shape can be given the insole but the fiber layer reinforces the rag stock and accurately maintains the mold of the entire insole so that when the insole is applied to the last it lies snugly against the last bottom and by reason of its conformation with the last bottom is held with greater certainty against displacement. By molding the insole and maintaining its shape prior to the incorporation of the insole in the shoe a superior appearing shoe is obtained because the insole insures the desired shape of the shoe until after it is vulcanized and, furthermore, obviates the possibility of the insole being vulcanized when in distorted position. On certain types of vulcanized boots and shoes, for example the so-called "arctic" or overshoe which is adapted to be worn over the usual shoe, the shank portion of the shoe is arched considerably in order that the heel portion of the overshoe may receive the heel of the wearer's shoe. The rag stock insoles heretofore used were not entirely satisfactory for the types of high arched shoes because the rag stock material could not be shaped so as to lie snugly against the bottom of the last and as a result considerable difficulty was experienced in lasting the upper over upon it. Moreover, as soon as the last was removed from the shoe the arched shank of the shoe tended to return to its normal flat position thus not only destroying the fit of the shoe but distorting it from the shape given it by the last and consequently affecting its salability.

In the use of an insole such as above described the shoe upper is lasted over upon the insole by cement with the same facility as with the use of the ordinary type of rag stock insole and the layer of uncured stock subsequently becomes amalgamated with the filler and outsole material during vulcanization in substantially the same manner. Also, the fiber board layer offers a superior interior surface for the shoe, both in the way of comfort to the wearer and in serviceability. Where the shoes having this insole incorporated in them are lasted by machine and tacks driven to hold the upper in lasted position on the insole, the fiber board offers a firm substance into which to drive the fastenings. In the use of the machine method of lasting shoes, it was heretofore the practice to employ either a leather or fiber insole but this kind of an insole was not entirely satisfactory inasmuch as the fiber board did not become sufficiently consolidated with the other bottoming materials during the vulcanization to produce a strong and serviceable shoe bottom. With the herein described insole structure this objection is obviated without forfeiting the advantages of the all fiber insole.

Having described my invention, what I claim as new and desire to secure by Letters Patent of the United States is:

1. As an article of manufacture, an insole ready for incorporation in a shoe comprising a sole-shaped body of unvulcanized vulcanizable material, and a body of fibrous material which is capable of being molded and retaining the mold imparted to it attached to one surface of the said vulcanizable material.

2. As an article of manufacture, an insole ready for incorporation in a shoe comprising a sole-shaped body of unvulcanized vulcanizable material, and a body of fibrous material which is capable of being molded and retaining the mold imparted to it attached to one surface of the said vulcanizable material, said two bodies being molded to the approximate longitudinal and lateral curvatures of the bottom of a shoe last.

3. As an article of manufacture, an insole ready for incorporation in a shoe comprising a layer of unvulcanized vulcanizable material, and an attached layer of a material having a fibrous texture adapted to receive and hold metallic fastenings, said insole being molded to a shape to correspond to the curvature of the bottom of a shoe last.

4. As an article of manufacture, an insole ready for incorporation in a shoe comprising a sole-shaped body of unvulcanized vulcanizable material, and an attached layer of fibrous material capable of being molded and retaining the mold imparted to it and to the unvulcanized material.

5. As an article of manufacture, a composite insole for shoes comprising a sole-shaped body of uncured rubber compound molded to the contour of the bottom of a last, and a correspondingly molded layer of fibrous material attached to the said rubber body, said fibrous material being capable of retaining the mold imparted to the body of rubber compound.

6. As an article of manufacture, a composite insole for shoes comprising a sole-shaped layer of uncured rubber compound and an attached layer of fiber board applied to its upper surface, said layer and said body being molded to the lateral and longitudinal curvatures of the bottom of a last.

7. As an article of manufacture, an insole ready for incorporation in a shoe, comprising a sole-shaped blank of vulcanizable but unvulcanized material which is incapable of being molded to permanent shape in its unvulcanized condition, a second sole-shaped blank of fibrous material superposed upon the vulcanizable blank, the material of the second blank being capable of being molded to permanent shape and of holding the unvulcanized material in a corresponding shape, and a layer of vulcanizable cement between the blanks.

In testimony whereof I have signed my name to this specification.

HERMAN A. DAVENPORT.